UNITED STATES PATENT OFFICE.

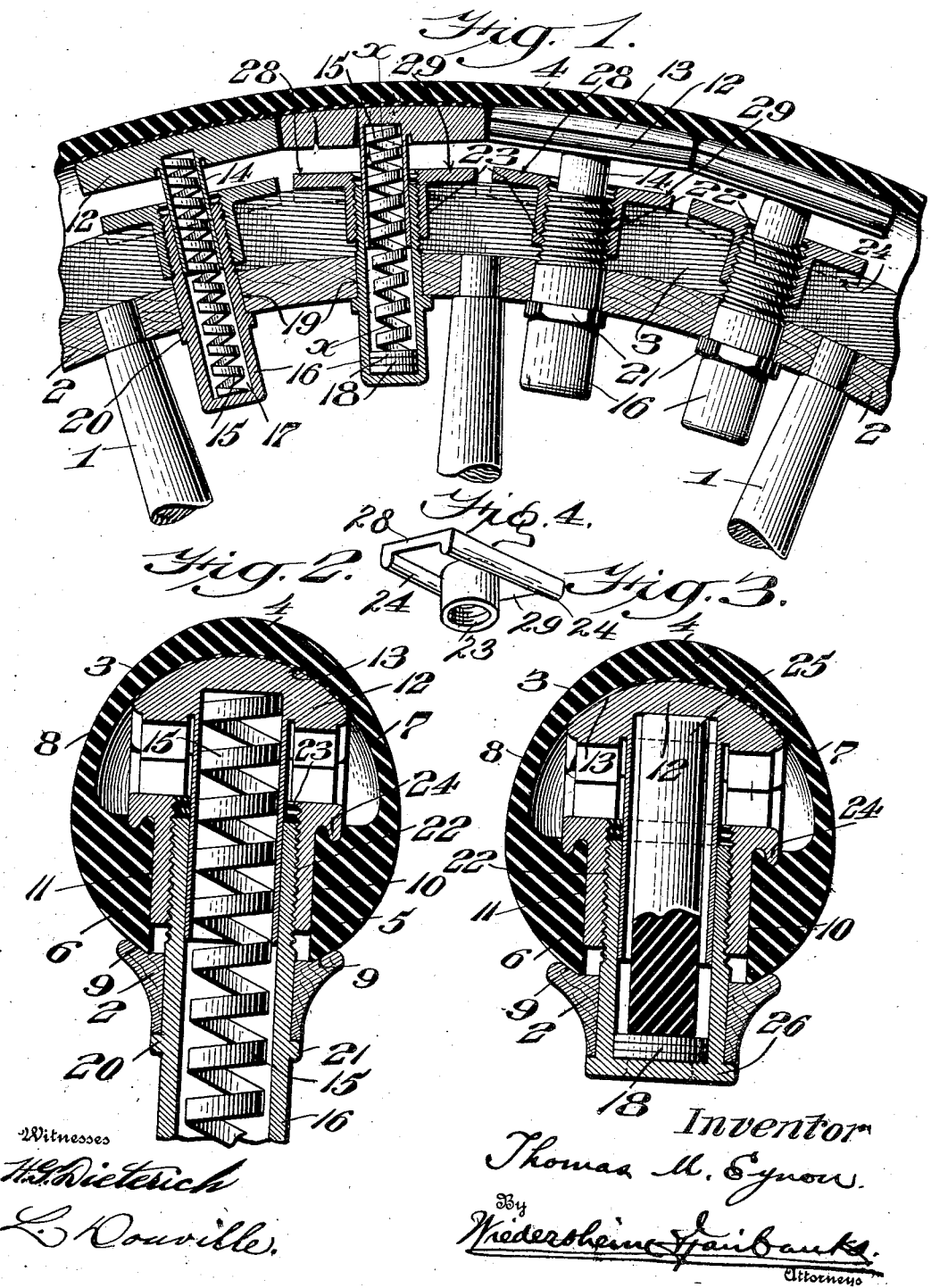

THOMAS M. EYNON, OF PHILADELPHIA, PENNSYLVANIA.

PUNCTURE-PROOF TIRE.

986,050.  Specification of Letters Patent.  Patented Mar. 7, 1911.

Application filed February 9, 1909. Serial No. 476,975.

*To all whom it may concern:*

Be it known that I, THOMAS M. EYNON, a citizen of the United States, residing in the city and county of Philadelphia, State of Pennsylvania, have invented a new and useful Puncture-Proof Tire, of which the following is a specification.

My invention relates to a new and useful puncture proof tire provided with a hollow thimble extending through the rim of the wheel and with a nut engaging with the tire and within the same and also engaging with the thimble for holding the latter and the tire in place, and a series of shoes arranged along the inner periphery of the tire and forced outwardly by tension devices seated within the thimble.

My invention relates to a novel construction of a thimble which is adapted to be inserted through the inner portion of the rim and to be engaged by an adjustable nut which engages the inner portion or thickened walls of the tire, said thimble receiving a tension device which is retained in position within it and within an extension projecting from the inner wall of each of the shoes employed, whereby vibration and skidding are considerably minimized and ample resilience is obtained without any liability of danger occurring from punctures.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a longitudinal section through a wheel provided with my invention. Fig. 2 represents a cross section upon line x—x of Fig. 1. Fig. 3 represents a cross section similar to Fig. 2 of a modified form. Fig. 4 represents a perspective view of the nut and flange thereon.

Similar numerals of reference indicate corresponding parts in the figures.

Referring to the drawings, 1 designates spokes of any usual or recognized type sustaining the rim 2 upon which the outer tire or shoe 3, of rubber or other resilient material, is placed. This outer tire consists of a preferably thickened tread 4 and base portions 5 and 6 forming thickened lateral terminations of the tire, and connecting webs or side portions 7 and 8. The base portions 5 and 6 are adapted to lie within the groove 9 of the rim 2 and to be held therein by means hereinafter specified.

The distance separating the juxtaposed surfaces 10 and 11 of the tire base may be substantially as shown in the drawing, corresponding to that of the particular spring supporting and engaging devices desired to be used or it may be less than this distance, in which latter case suitable provision may be made for accommodating the tire separating and engaging structure. In the forms illustrated, I have preferred to space the faces 10 and 11 by a distance corresponding to substantially the width of the tubular nut hereinafter described.

I support the tread of the tire by means of the shoes 12 whose outer surfaces are preferably coated with a covering of rubber or any suitable material 13 rigidly attached to the shoe to provide advantageous engagement with the inner surfaces of the tread of the tire. The outer surface of the material 13 may thus be made to perform a gripping function to protect against creeping of the tread relatively to the base of the tire or where this is not desirable it may be made of such character as to offer as little friction and wear with and upon the inner surfaces of the tread as possible; in either event it will form a more advantageous means of engagement with the inner surfaces of the tread than the shoes 12 which by reason of the duty otherwise required of them are preferably of metal.

Upon the inner side of each of the shoes 12, I have provided a rigid extension 14 which is made tubular or hollow to permit the insertion of the spring 15 within the same. This tubular extension 14 is adapted to slide into and be guided by the inner bore of the thimble 16 upon the bottom 17 of which the end of the spring 15 is intended to rest. In order to secure the proper or desired adjustment of the tension of the spring 15 without necessitating the altering of the dimensions thereof, I have illustrated the disks or washers 18, seen in Fig. 3, in the bottom 17 of one of the thimbles 16 which disks or washers may be of any suitable or desired size or number and will evidently compress the spring inwardly to any desired extent. The thimble 16 is inserted from the inside of the wheel through an aperture 19 in the rim to an extent which is limited by the shoulder 20, which I have shown as of hexagonal or similar exterior contour at 21, in order that a wrench may be readily applied thereto when the parts are assembled.

The tubular socket or thimble 16 is externally threaded at 22 to engage with a hollow nut 23 having an outwardly and downwardly extended flange 24 preferably on each side only thereof for engagement with the base members 5 and 6, whereby the desired compression thereof may be attained by turning the thimble 16 to the desired extent.

The flanged portion of the thimble 10 is rectangular in top plan view with the threaded opening shown in the center thereof and is guttered in the bottom plan view with the cylindrically threaded boss or extension projecting downwardly from the center thereof, as best seen in Fig. 4.

It will be evident that the tire is spring-distended by means of each of the shoes 12 and the springs 15, which are in turn guided and stiffened against creeping and lateral movement by the tubular guide 14, and that furthermore this tubular guide and nut 23 offer means for supporting this structure and at the same time retaining the base of the tire rigidly in place which means can be tightened at any time from the inside of the wheel without removal of the tire.

In the structure shown in Fig. 3, I have employed the same main tire, shoe, guide and nut as in the structure shown in Fig. 2 but I have employed a solid rubber spring, buffer or cushion 25 instead of the spiral spring 15 and employ a somewhat shorter socket or thimble whose outer portion terminates on a line with the hexagonal head 26. This shortening of the tubular socket is of course equally applicable to the form shown in Figs. 1 and 2 when a shorter spiral spring would be employed which can be readily compressed within the space thus provided. In Fig. 3 I have also shown the space, occupied by the solid or other rubber spring, as further reduced by means of disks 18. The operation of the structure shown in Fig. 3 is identical with that shown in Fig. 2 except that the spiral spring is substituted in Fig. 2 by the solid rubber spring 25, seen in Fig. 3.

It will be apparent in both embodiments of my invention that when the shoes 12 are made of the proper materials and the thimbles 16 (which I preferably employ in groups of two between each pair of spokes) are properly adjusted with respect to the nuts 23 and the tension devices, so that a puncture proof tire is produced which has all the resiliency and the cushioning qualities of the inflated tires now generally employed and the life of the same is limited only by the wearing capacity of the outer tread 4.

In some instances it may be desirable to employ the solid cushion 25 of rubber or other resilient material in lieu of the coil spring 15 seen in Figs. 1 and 2.

It will be evident that my invention gives free access for adjustment of the clamping parts and permits free removal of the tire as desired, either partially or totally at the same time that it secures the parts against leakage of dust and dirt into or between the tires and insures cleanliness of the interior parts. Repairs are also greatly facilitated in that springs can be removed and changed readily and quickly and entire spring units including springs with cylindrical casing therefor can readily be inserted.

It will be apparent that changes may be made by those skilled in the art in the manner of assembling the shoes, thimbles, nuts, cushioning devices and their adjuncts without departing from the spirit of my invention and I do not therefore desire to be limited in every instance to the exact features of construction herein shown and described.

Having thus described my invention, what I claim as new and desire to secure by Letters Patent, is:—

1. In a device of the character stated, a rim, a hollow thimble extending through said rim, a tire, a nut within said tire, engaging with said thimble and bearing upon the inner portion of the tire for holding said thimble and tire in place, a shoe, a guide upon said shoe, and tension devices removable through the rim and located within said thimble for pressing said shoe outwardly from said thimble against said tire.

2. In a device of the character stated, a rim, a thimble extending through said rim and having a shoulder thereon, a tire, a nut within said tire engaging with said thimble and bearing upon the inner portion of the tire for holding said thimble in place, and spring tire-distending means for said tire located within said thimble.

3. In a device of the character stated, a resilient tire having an outer thickened tread and thickened annular base portions, a curved rim within which said base portions are seated, a thimble extending through said rim and having a polygonal shoulder engaging said rim, a threaded nut engaging said thimble and the contiguous portion of said tire, a shoe engaging the inner portion of said tire and provided with an extension projecting into said thimble, and a cushioning device pressing against said shoe and against said thimble.

4. In a device of the character stated, a resilient tire having an outer thickened tread and thickened annular base portions, a curved rim within which said base portions are seated, a thimble extending through said rim and having a polygonal shoulder engaging said rim, a threaded nut engaging said thimble and the contiguous portion of said tire, a shoe engaging the inner portion of said tire and provided with an extension projecting into said thimble, a cushioning device located intermediately of said shoe and thimble to press the shoe outwardly, and a covering located intermediately of the outer surface of said shoe and the inner juxtaposed portion of said tire to prevent slipping or friction of the parts.

5. In a device of the character stated, a rim, an interiorly opening tire mounted thereon, a nut, flanges upon opposite sides of said nut for engagement with the adjacent edges of the tire, a hollow bolt passing through said rim to engage with the nut and resilient means seated within said bolt for pressing the tire outwardly.

6. In a device of the character stated, a rim, a hollow tire seated on the same, a nut engaging and retaining said tire, a hollow screw-bolt passed through the rim and engaging said nut, and resilient means within said bolt and extending outwardly to support the tire.

7. In a device of the character stated, a rim, a tire mounted thereon, a nut retaining the tire in position, a hollow bolt passing through the rim to engage with the nut, a shoe, a guide for said shoe passing within said bolt and resilient means for sustaining the guide and shoe.

8. In a device of the character stated, a rim, a tire mounted thereon, a nut engageable with the tire to retain it in position, a hollow bolt passing through the rim to engage with the nut, a shoe, a guide for said shoe passing within said bolt, and resilient means within said guide for pressing the shoe outwardly.

9. In a device of the character stated, a rim, a tire thereon, a shoe engageable with said tire interiorly, a nut engageable with the tire to retain it in position, a tubular bolt engageable with said nut, a hollow guide for said shoe passing within the bolt, and spring means for forcing the shoe outwardly located within the bolt and guide.

10. In a device of the character stated, a rim, a thimble extending through said rim, projecting and accessible for detachment from the hub side, a nut secured upon said thimble, a tire having annular thickened base members engaged by said nut, a shoe within the tire, and tensional devices guided by the thimble and pressing the shoe against the interior of the tire.

11. In a device of the character stated, a rim, a hollow thimble extending through said rim, a nut engaging the outer portion of said thimble, a tire having terminal base members retained by said nut, a shoe within the tire, a guide upon said shoe extending within said thimble and tension devices intermediate of said thimble and shoe.

THOMAS M. EYNON.

Witnesses:
W. S. JACKSON,
C. D. McVAY.